United States Patent [19]

Uriarte Odriozola

[11] Patent Number: 4,940,260
[45] Date of Patent: Jul. 10, 1990

[54] FLUID CONDUIT COUPLING DEVICE

[75] Inventor: José I. Uriarte Odriozola, Vitoria, Spain

[73] Assignee: Terrain SDP, S.A., Vitoria, Spain

[21] Appl. No.: 381,956

[22] Filed: Jul. 19, 1989

[30] Foreign Application Priority Data

Jan. 23, 1989 [ES] Spain ................................. 8900166

[51] Int. Cl.⁵ ............................................ F16L 35/00
[52] U.S. Cl. ........................................... 285/3; 285/92
[58] Field of Search ................... 285/92, 89, 82, 117; 403/320; 411/130, 131, 132, 133, 134, 135

[56] References Cited

U.S. PATENT DOCUMENTS

| | | | |
|---|---|---|---|
| 903,435 | 11/1908 | Barott | 285/82 X |
| 2,118,350 | 5/1938 | Holt | 285/82 X |
| 3,608,933 | 9/1971 | Loe | 403/320 X |
| 4,030,798 | 6/1977 | Paoli | 285/89 |
| 4,034,788 | 7/1977 | Melone | 411/134 |

Primary Examiner—Dave W. Arola
Attorney, Agent, or Firm—Young & Thompson

[57] ABSTRACT

The invention refers to a coupling device for fluid conduits suitable for cases in which uncontrolled tamperings of the coupling ought to be avoided. The device includes a head provided with a coupling thread for a sleeve which incorporates a straight-profiled dentation, while between the sleeve and the head there is a complementary ring provided with another dentation. The dentations are oriented to permit the sleeve to turn in a tightening direction and to prevent it from turning in the opposite direction at the end of the coupling phase by means of angular fixing means consisting of a plurality of lugs arranged on the perifery of the complementary ring. The dentation at the front of the sleeve and the dentation of the complementary ring cover these elements totally or in part.

4 Claims, 3 Drawing Sheets

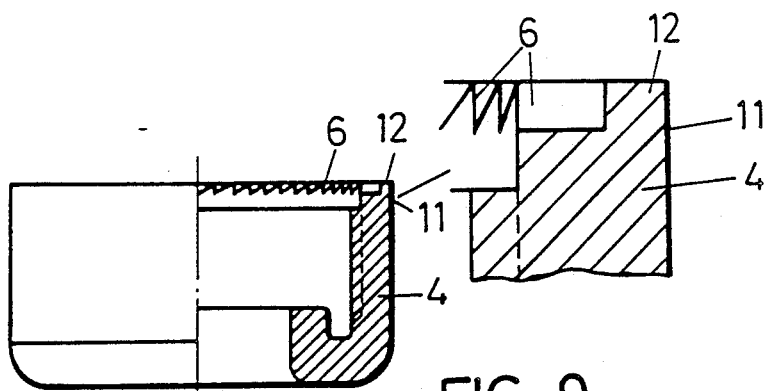
FIG.-9
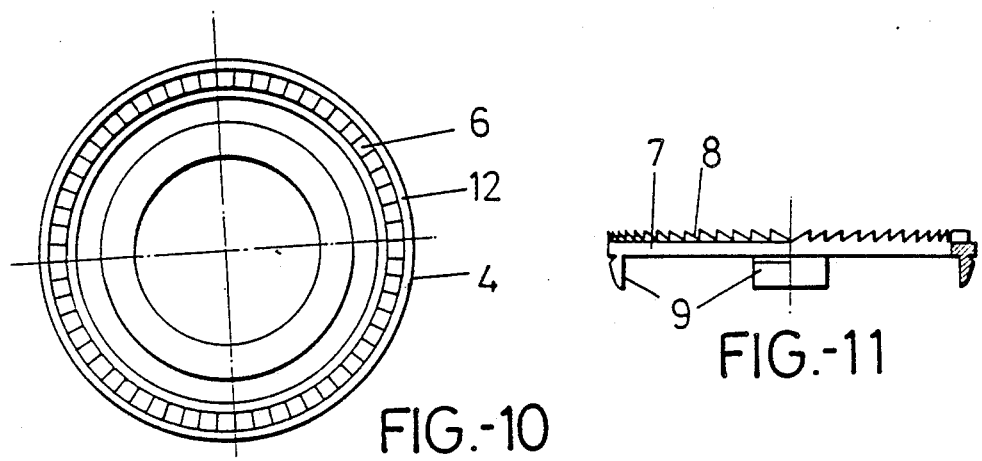
FIG.-10
FIG.-11
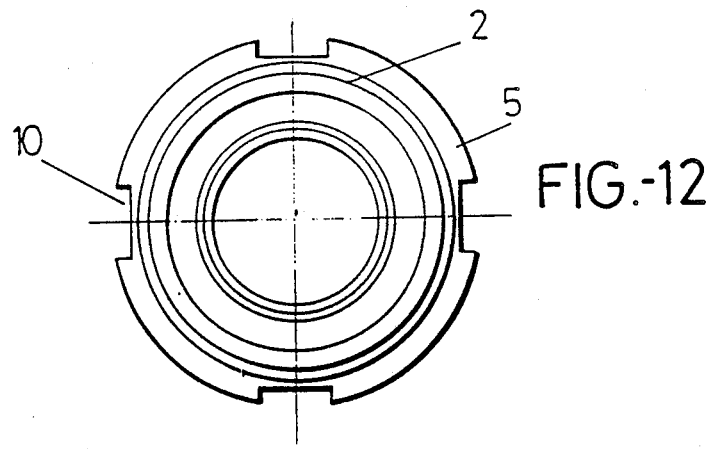
FIG.-12

FLUID CONDUIT COUPLING DEVICE

OBJECT OF THE INVENTION

The present invention refers to a coupling device for fluid conduits, the structural characteristics of which have been designed to secure, independently of the unavoidable sealing of the said coupling, that the conduits are not accidentally dismounted, once coupled, and if they are voluntarily removed, that evidence of such removal remains.

In accordance with the aforegoing, the device of the invention is specially suitable for use in those cases in which uncontrolled tamperings of the coupling ought to be avoided, or in those cases in which a possibility of uncoupling, due to vibrations, water-hammers, etc., is visualised.

BACKGROUND OF THE INVENTION

As it is known, one of the most commonly used solutions for the coupling between fluids consists in establishing, in one of the said conduits and as a terminal thereof, a threaded head which is aided by a matching threaded sleeve, so that the said sleeve is capable of adapting and securing a second conduit to the said head, with a tight coupling between these elements, generally obtained by the deformation of a sealing gasket.

As mentioned, this solution is one of the most commonly used for coupling fluid conduits because, since the handlings are quick and simple, there is neither a need for the pipes or conduits to be cut at the exact measurements as the coupling system enables substantial clearances to be absorbed, nor is specialised personnel required to carry out the coupling which only requires, for an optimum functionality, an assurance that the sleeve has been conveniently threaded, to its maximum, to the head.

However, this solution presents in practice, at least in determined cases, problems as to uncoupling, such as for example when the installation or a part thereof is subjected to vibrations which could cause the automatic unscrewing of the sleeve, or when this can be produced by water hammers, or by any other effect capable of producing the said unscrewing. Another problem posed by this solution consists in that the installation, and specifically the coupling points between the pipes or conduits, may be tampered with and there are no means for avoiding or at least controlling them.

DESCRIPTION OF THE INVENTION

The coupling device of the invention has been designed to overcome these problems satisfactorily and, therefore it is characterised in that it incorporates between the head and the sleeve anti-unscrewing means.

More specifically, these elements have been provided with complementary straight teeth, so that at the maximum threaded position of the sleeve the said teeth permit such operation to take place until the complete maximum tightened position is reached, by means of the "Jumping" of some teeth onto others through their inclined planes, whilst it is absolutely impossible for the sleeve to turn in the opposite direction, that is to say, in the unscrewing direction, since the teeth, in this direction, face one another through their straight perpendicular planes. Further, whereas the dentation corresponding to the sleeve is formed on the opening of the sleeve, the dentation corresponding to the head is not formed on the head but on a complementary ring provided in turn with lugs through which the head is blocked in an angular position by means of the coupling of the said lugs in corresponding indentations of the head. This prevents, as previously mentioned, the accidental unscrewing of the coupling. However, it permits the voluntary unscrewing by breaking the said lugs, in which case the complementary ring could turn freely with respect to the head during the unscrewing operation.

As it is obvious, the coupling device of the invention is likewise applicable to fluid conduits in which the sleeve is coupled to the head by means of a bayonet system.

DESCRIPTION OF THE DRAWINGS

A complete description will now be made of the said coupling device for fluid conduits, with reference to the accompanying drawings, in which, merely by way of example and not limiting, a preferred mode of embodiment is represented, the details of which may be modified without fundamentally altering the main characteristics thereof.

In the said drawings.

FIG. 9—Illustrates a side elevation, quarter-sectional view of a sleeve similar to that represented in FIGS. 5 and 6, but the dentation of which is slightly set back with respect to its edge so that it will not be noticeable from the outside.

FIG. 10—Illustrates an axial view of the sleeve represented in FIG. 9.

FIG. 11—Illustrates a side elevation, quarter-sectional view of a complementary ring provided with four fixing lugs to the head instead of two as in the case of FIG. 4.

FIG. 12—Finally illustrates an axial view of the head cooperating with the ring of FIG. 11.

PREFERRED EMBODIMENT OF THE INVENTION

Figure 1:
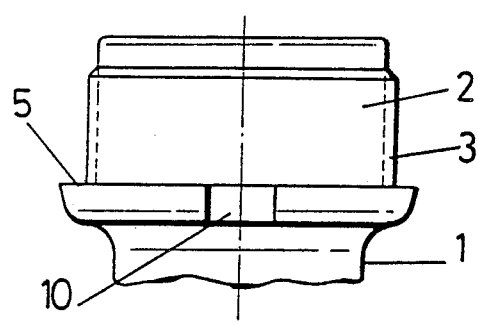
FIG. 1—Illustrates a side elevational view of a head pertaining to a fluid conduit provided with the coupling device of the present invention.

Referring to the drawings, it can be seen that the coupling device of the invention is applicable to fluid conduits in which a determined conduit or pipe is provided with a head 1, ending in a neck 2, provided with a male thread 3 on which is mounted a sleeve 4 provided, in turn, with a complementary female thread, the said head 1 being provided with an external perimetral shoulder 5 acting as a penetration stop for the said sleeve 4.

Departing from this structure, which should not be regarded in an exclusive sense since the coupling between the sleeve 4 and the head 1 could also be of the bayonet type, the invention is characterised in that the said sleeve 4 incorporates at its edge adjacent shoulder 5 a dentation 6, having a straight profile, whilst the head 1 is aided by a complementary ring 7 provided with a dentation 8 which, in turn, is complementary of the dentation 6 of the sleeve 4. Thus, the orientation of the teeth of these two dentations 6 and 8 is such that it permits the relative turning of the sleeve 4 with respect to the head 1 in a threading or coupling direction between such elements, whereas it prevents the relative movement thereof in the opposite direction, that is to say, the said teeth act as anti-unscrewing means, wherefore and as it can be seen, the complementary ring 7 should be provided with anti-turning fixing means to the head 1.

The said angular fixing means consists of lugs 9 which protrude from the complementary ring 7 in a parallel arrangement to its axis and which fit into indentations 10 of the head 1. There could be two of such lugs 9 and such notches 10 and they are capable of being positioned in diametral opposition, as in the practical mode of embodiment shown in FIGS. 1 to 8, or there could be four and they may also be equiangularly arranged, as in the case of FIGS. 11 and 12.

Figure 3:
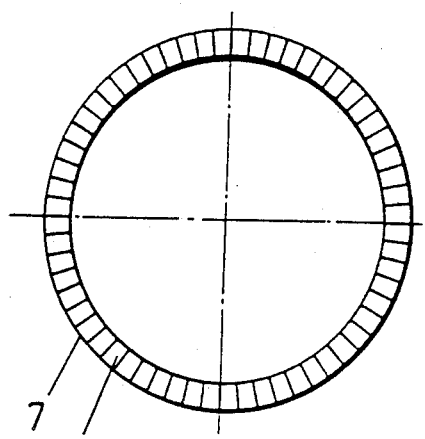
FIG. 3—Illustrates an axial view of the complementary ring.
Figure 2:
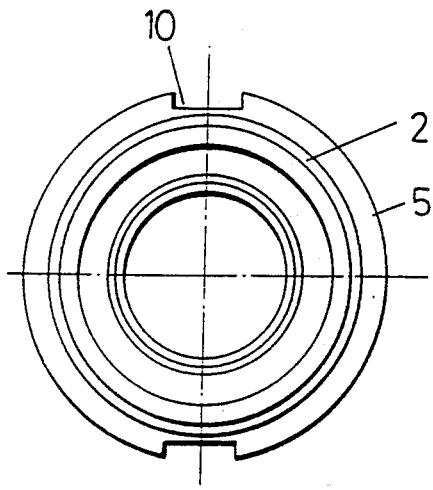
FIG. 2—Illustrates an axial view of the same head.
Figure 4:
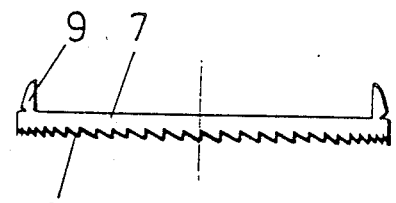
FIG. 4—Illustrates a side elevational view of the same ring.
Figure 6:
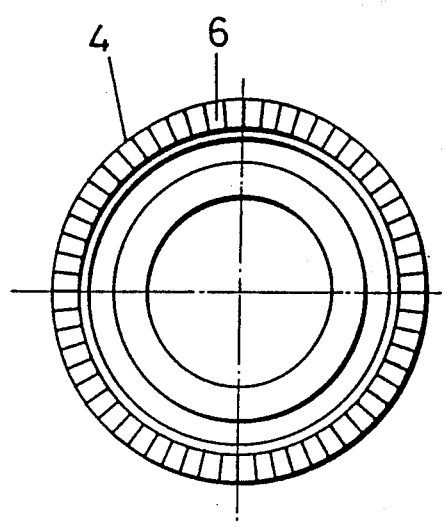
FIG. 6—Illustrates an axial view of the same sleeve.

Although in the practical mode of embodiment of the drawings, and as can be seen specifically in FIGS. 3 and 6, the dentation 6 of the sleeve 4 covers the front edge thereof completely, as in the case of the dentation 8 of the complementary ring 7, these dentations may be partial, without departing from the scope of the invention.

Also, optionally, the dentation 6 of the sleeve 4 may be open laterally towards the also lateral wall of the said sleeve, as in the case of FIGS. 1 to 8, or the dentation 6 may be set back with respect to the outer face 11 of the sleeve 4, as can be seen in FIG. 9 and specially in the enlarged detail thereof, establishing on the outside of the teeth 6 a smooth continuous sector 12 which conceals the said teeth once the sleeve has been assembled to the head and when viewing the assembly normally.

It should be emphasised that, although the sleeve 4 has been represented in the drawings with a smooth outer surface, this is preferably fluted, knurled or provided with any type of roughness which facilitates the tightening operation thereof.

As can also be seen, the coupling device is not only applicable to the direct joining between two conduits, but also to the joining of conduits with the help of sleeves, elbows, "T's", or any other conventional accessory of this type.

Figure 7:
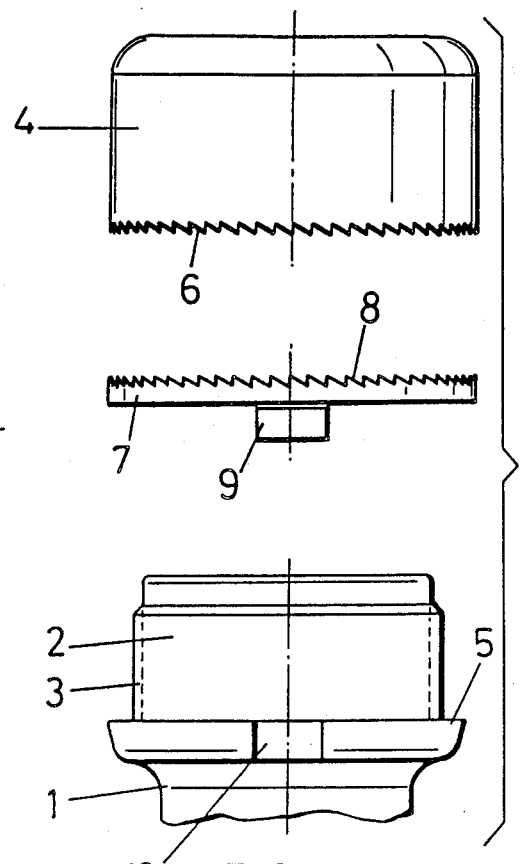
FIG. 7—Illustrates a side elevational view of the head, the complementary ring and the sleeve, suitably faced, in accordance with the subsequent assembly position thereof.
Figure 5:
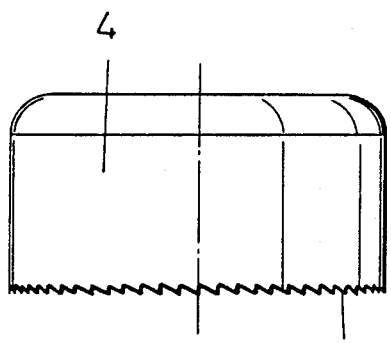
FIG. 5—Illustrates a side elevational view of the sleeve complementary to the former parts.
Figure 8:
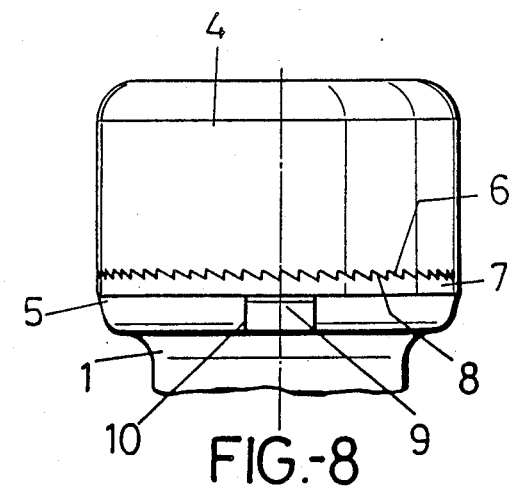
FIG. 8—Illustrates the unit of FIG. 7 once mounted or definitely coupled.

In any case and as can be seen in an assembly as that of FIGS. 7 and 8, the complementary dentations 6 and 8 permit the device to be manipulated in the tightening direction for coupling, since the complementary ring 7 is maintained securely Joined to the head 1 and is consequently blocked because its lugs 9, whether two or four, are housed in the corresponding indentations 10 of the head 1. This prevents an accidental uncoupling, due to vibrations, water hammer or the like from taking place, whilst it permits a voluntary uncoupling, specifically by breaking the lugs 9, wherefore the complementary ring 7 is freed from the head 1, but evidence thereof remains due to the non-existence of the said lugs 9.

Therefore, in order to avoid tamperings of which there is no evidence, when replacing the broken complementary ring for a new one, in the initial marketing of the device all the coupling parts will have a determined colour, whereas the spare complementary rings will have another colour, so that their replacement within the installation will immediately be noticed.

The shape, dimensions and materials, and in general any accessory, could be varied, provided that the described object is not altered, changed or modified.

The terms in which this specification is worded are true and truly describe, the object and should, accordingly, be regarded in an illustrative rather than a restrictive sense.

I claim:

1. Fluid conduit coupling device including a conduit head provided with a coupling thread for a threaded sleeve by means of which a conduit is tightly secured to said head, said sleeve having an end adjacent said head, said end provided with a straight-profiled dentation, and between the said sleeve and the head there is provided a complementary ring provided, in turn, with another dentation, complementary to that of the sleeve, said ring having an axis said dentations being oriented so as to permit the sleeve to turn in a tightening direction when threaded on said conduit head and to prevent the sleeve from turning in the opposite direction, and means for fixing said complementary ring to the head against rotation in either direction.

2. Fluid conduit coupling device according to claim 1, characterised in that the means for fixing the complementary ring to the head consists of a plurality of lugs, equiangularly arranged on the periphery of the complementary ring, integral with the said ring and parallel to the axis of the ring, designed to fit snugly inside respective indentations in the head, to retain said ring against rotation of the ring relative to said head, said lugs being frangible in order to permit the voluntary angular uncoupling between the ring and the head, for dismounting the sleeve from conduit head.

3. Fluid conduit coupling device according to claim 1, characterised in that both the dentation of the sleeve and the dentation of the complementary ring extend at least part way about the sleeve and the ring.

4. Fluid conduit coupling device according to claim 1, characterised in that the dentation of the sleeve is set back radially inwardly with respect to its outer side surface, forming at its opening an outer continuous perimetral sector which conceals the dentation.

* * * * *